United States Patent
Wong et al.

(10) Patent No.: US 11,128,672 B2
(45) Date of Patent: Sep. 21, 2021

(54) LAWFUL INTERCEPT IN FUTURE CORE INTERWORKING WITH EVOLVED PACKET SYSTEM

(71) Applicant: Verizon Patent and Licensing Inc., Arlington, VA (US)

(72) Inventors: William W. Wong, Madison, NJ (US); Amir Saghir, Frisco, TX (US); Rakesh Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 16/682,569

(22) Filed: Nov. 13, 2019

(65) Prior Publication Data
US 2021/0144184 A1    May 13, 2021

(51) Int. Cl.
*H04L 29/06* (2006.01)

(52) U.S. Cl.
CPC ............ *H04L 63/306* (2013.01); *H04L 63/20* (2013.01); *H04L 65/105* (2013.01); *H04L 65/1006* (2013.01); *H04L 65/1016* (2013.01); *H04L 65/1069* (2013.01)

(58) Field of Classification Search
CPC ... H04L 63/306; H04L 63/20; H04L 65/1016; H04L 65/1069; H04L 65/1006; H04L 65/105
See application file for complete search history.

(56) References Cited

U.S. PATENT DOCUMENTS

| | | | | |
|---|---|---|---|---|
| 8,588,109 B2* | 11/2013 | Li | ......................... | H04L 65/103 370/259 |
| 9,258,742 B1* | 2/2016 | Pianigiani | ............... | H04L 45/38 |
| 2011/0141947 A1* | 6/2011 | Li | ......................... | H04L 63/306 370/259 |
| 2012/0069971 A1* | 3/2012 | Jayaraman | ............ | H04L 63/306 379/35 |
| 2012/0207284 A1* | 8/2012 | Tian | .................... | H04L 65/1073 379/7 |
| 2012/0254403 A1* | 10/2012 | Imbimbo | .............. | H04W 12/03 709/224 |

(Continued)

OTHER PUBLICATIONS

LTE; 5G; Digital cellular telecommunications system (Phase 2+) (GSM); Universal Mobile Telecommunications System (UMTS); ETSI TS 133 127 V16.4.0 (Nov. 2020) (Year: 2020).*

(Continued)

*Primary Examiner* — Alina A Boutah

(57) ABSTRACT

A method, a device, and a non-transitory storage medium are described in which a inter-networked lawful intercept service is provided. The inter-networked lawful intercept service may include providing lawful intercept information from a proxy call session control function to a future generation core network device. The proxy call session control function may be resident in an Internet Protocol Multimedia Subsystem network. The proxy call session control function may use a Diameter message that includes the lawful intercept information. The future generation core network device may be a policy control function. The lawful intercept information may be further provided to other core network devices, such as a session management function and a use plane function.

20 Claims, 15 Drawing Sheets

(56) References Cited

U.S. PATENT DOCUMENTS

| | | | |
|---|---|---|---|
| 2013/0203380 A1* | 8/2013 | Lin | H04W 12/80 |
| | | | 455/410 |
| 2014/0126474 A1* | 5/2014 | Eriksson | H04L 67/2857 |
| | | | 370/328 |
| 2015/0009864 A1* | 1/2015 | Kim | H04L 63/306 |
| | | | 370/259 |
| 2015/0139041 A1* | 5/2015 | Bosch | H04L 63/306 |
| | | | 370/259 |
| 2015/0208232 A1* | 7/2015 | Liebhart | H04L 61/6054 |
| | | | 370/328 |
| 2016/0323178 A1* | 11/2016 | Hammer | H04L 63/306 |
| 2017/0085704 A1* | 3/2017 | Rao | H04M 3/54 |
| 2018/0227750 A1* | 8/2018 | Gustafsson | H04W 36/0033 |
| 2019/0306324 A1* | 10/2019 | Al-Mehdar | H04W 4/24 |
| 2019/0335392 A1* | 10/2019 | Qiao | H04W 76/27 |
| 2020/0084127 A1* | 3/2020 | Shaikh | H04L 43/06 |
| 2020/0267784 A1* | 8/2020 | Bharatia | H04W 80/10 |
| 2020/0358909 A1* | 11/2020 | Ahmadi | H04W 76/11 |
| 2021/0021647 A1* | 1/2021 | Cai | H04L 65/1026 |
| 2021/0112439 A1* | 4/2021 | Leung | H04W 28/0236 |

OTHER PUBLICATIONS

Cloud Native Core Console User's Guide; Policy Control Function (PCF). (Year: 2021).*

* cited by examiner

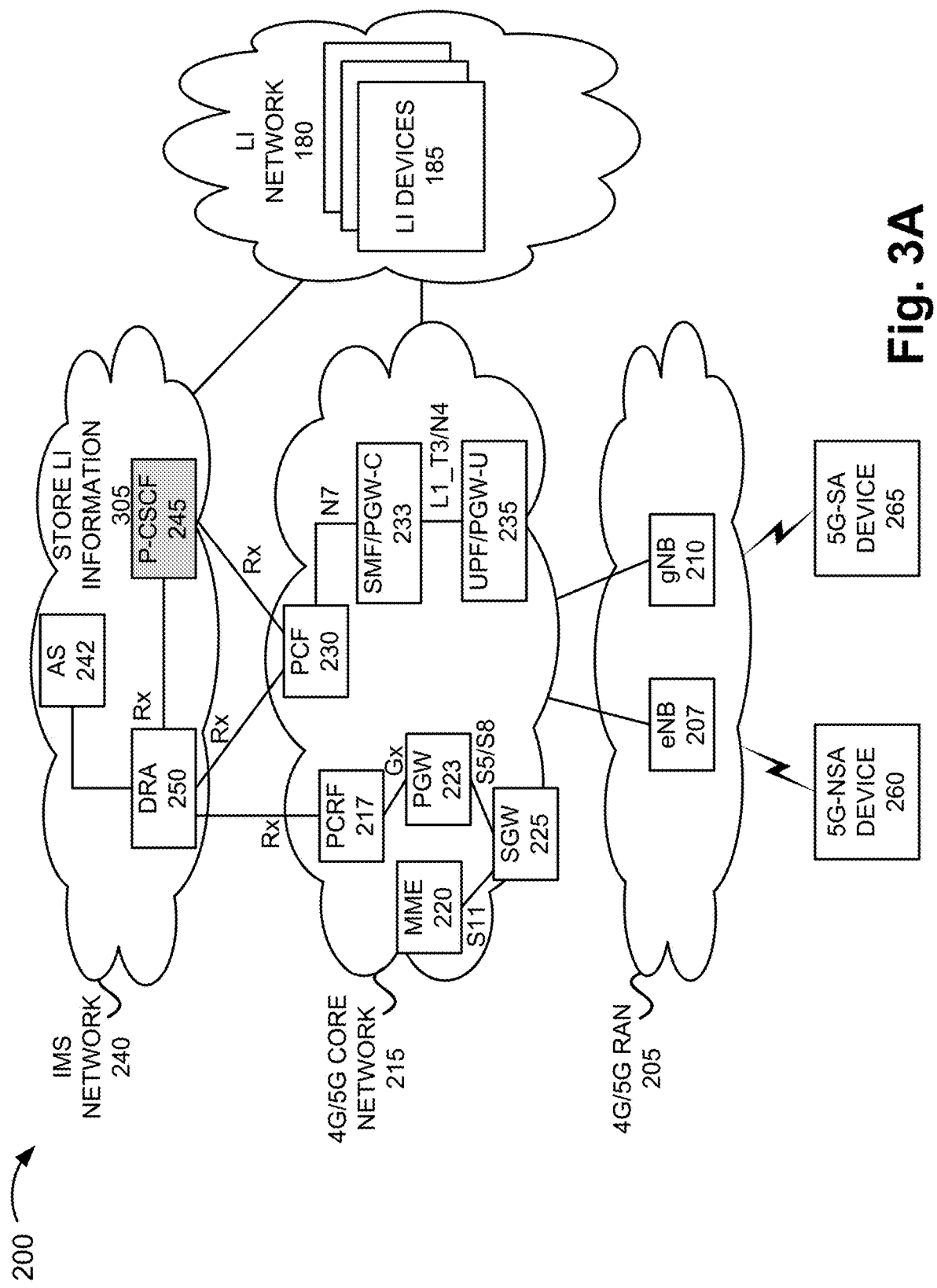

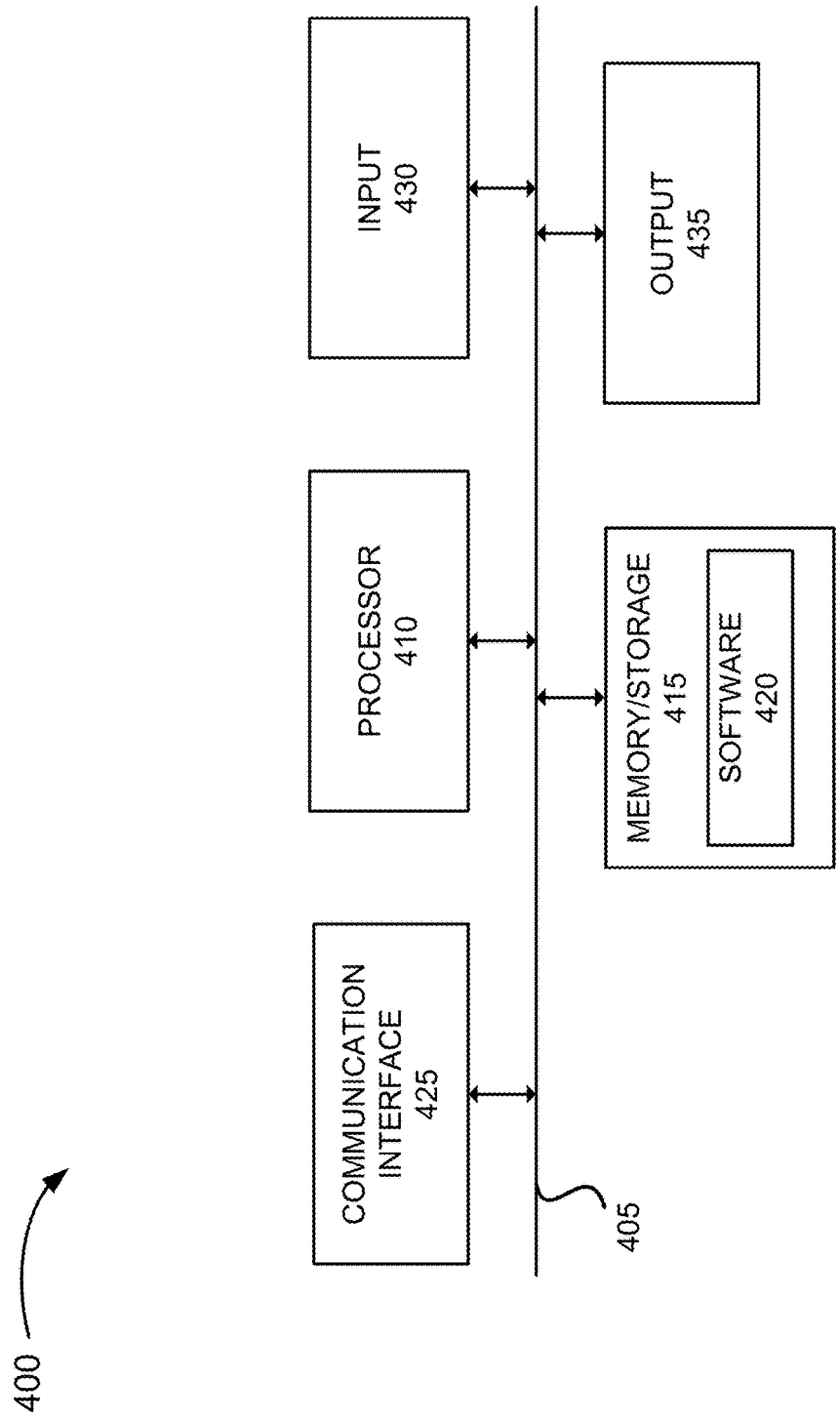

LAWFUL INTERCEPT IN FUTURE CORE INTERWORKING WITH EVOLVED PACKET SYSTEM

BACKGROUND

Development and design of new networks present certain challenges from a network-side perspective and an end device perspective. Typically, a network deployment supports lawful intercept of private communications by a law enforcement agency or other authorized entity. For example, in an evolved packet core (EPC) and Internet Protocol Multimedia Subsystem (IMS) network deployment, lawful intercept may be supported.

BRIEF DESCRIPTION OF THE DRAWINGS

FIGS. 3A-3I are diagrams illustrating an exemplary process of an exemplary embodiment of the inter-networked lawful intercept service;

FIG. 4 is a diagram illustrating exemplary components of a device that may correspond to one or more of the devices illustrated and described herein;

DETAILED DESCRIPTION OF PREFERRED EMBODIMENTS

Figure 1:
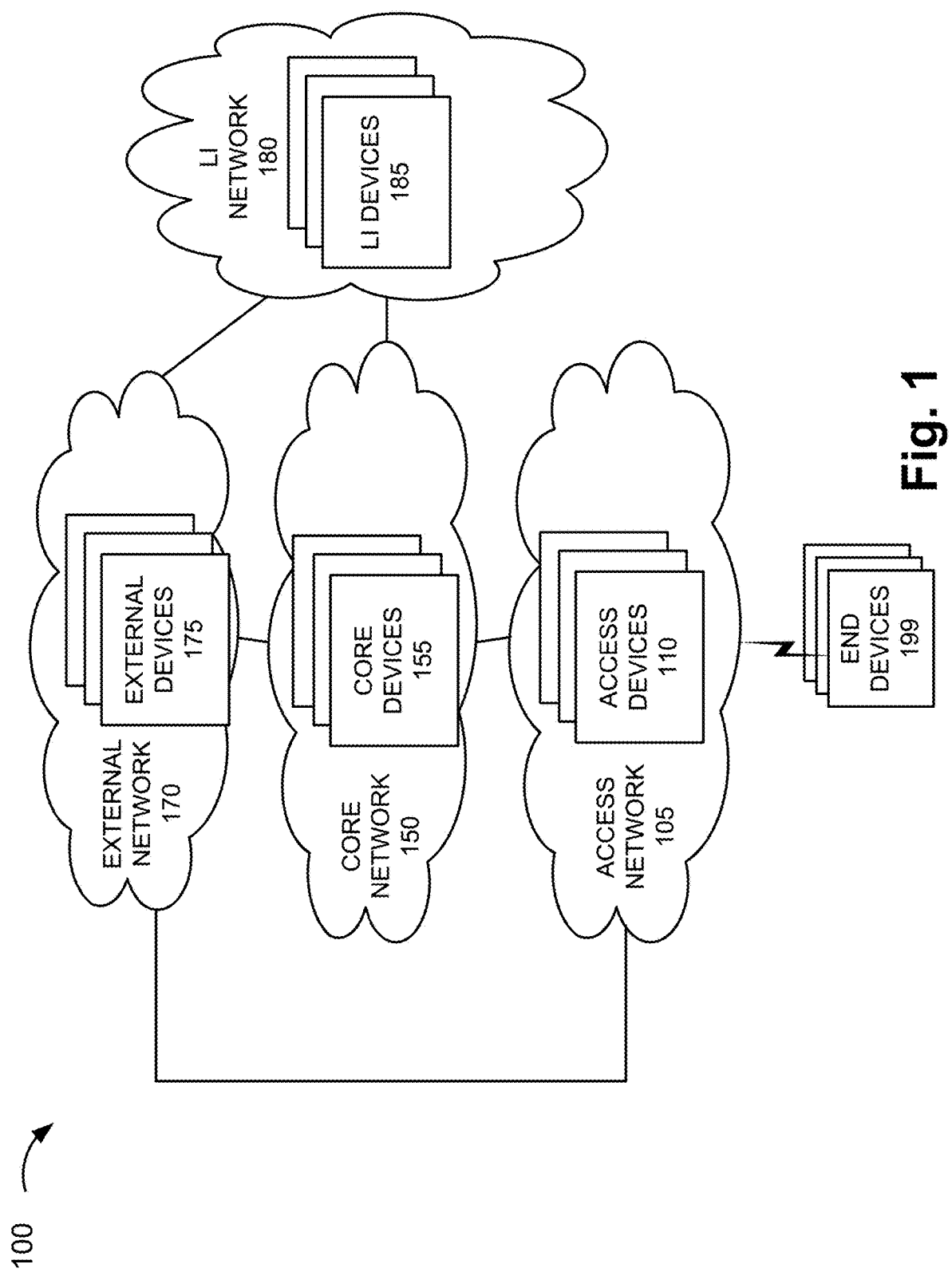
FIG. 1 is a diagram illustrating an exemplary environment in which an exemplary embodiment of a inter-networked lawful intercept service may be implemented.

The following detailed description refers to the accompanying drawings. The same reference numbers in different drawings may identify the same or similar elements. Also, the following detailed description does not limit the invention.

Support for lawful intercept of a communication in a network is required in the United States and in some places abroad. With the development of future networks, such as Fifth Generation (5G) networks and/or other types of new prospective networks, mechanisms that support lawful intercept should be considered. However, in the design of a future network, there are considerations relating to inter-networking between the future network, which includes various types of network devices, and a legacy network, which includes various legacy network devices. Furthermore, there are considerations relating to how such an inter-networking should be implemented. Additionally, in the context of lawful intercept, the inter-networking may not be limited to radio access networks and core networks, but may also include an application layer network that provides a communication service to which the lawful intercept may be directed.

According to exemplary embodiments, an inter-networked lawful intercept service is described. According to an exemplary embodiment, the inter-networked lawful intercept service pertains to a 5G network inter-networking with a Fourth Generation (4G) Evolved Packet System (EPS), such as an IMS network. According to other exemplary embodiments, the inter-networked lawful intercept service may pertain to another type of EPS or non-future generation application service layer network. For example, the inter-networked lawful intercept service may pertain to a network other than the IMS network, such as a Rich Communication Service (RCS) network, or another type of application service layer network. The application service layer network may support voice and/or other types of communication services that may be subject to lawful intercept. For example, the other types of communication services may include Session Initiation Protocol (SIP)-based communications, non-SIP-based communication services (e.g., web browsing or other types of packet data traffic), a video call, a Voice-over-Internet Protocol (VoIP) call, or other types of application services (e.g., Over-The-Top (OTT), RCS, etc.).

According to an exemplary embodiment of the inter-networked lawful intercept service, a Call Session Control Function (CSCF) of an IMS network may detect a communication setup for a user that is subject to lawful intercept surveillance. The Call Session Control Function may generate lawful intercept information that enables a requested lawful intercept to be carried out. The Call Session Control Function communicates the lawful intercept information to a network device of the future core network. For example, the future core network may be implemented as a 5G core network. According to an exemplary embodiment, the network device of the 5G core network includes a Policy Control Function (PCF). According to another exemplary embodiment, the network device of the future core network may be a non-standard core network device, a proprietary core network device, or another type of core network device.

According to some exemplary embodiments, the Call Session Control Function may communicate the lawful intercept information to the future core network via an intermediary network device. According to other exemplary embodiments, the call session control function may communicate the lawful intercept information to the future core network directly without the intermediary network device.

According to an exemplary embodiment of the inter-networked lawful intercept service, the network device of the future core network may provide the lawful intercept information to other network devices of the future core network so that lawful intercept surveillance may be performed. According to an exemplary embodiment, the PCF in the 5G core network may pass the lawful intercept information to a Session Management Function (SMF), as described herein. Additionally, according to an exemplary embodiment, the SMF may provide lawful intercept information to a User Plane Function (UPF), as described herein.

In view of the foregoing, the inter-networked lawful intercept service may allow future network inter-networking with an IMS network in a manner that supports lawful intercept surveillance. For example, IMS communication services via a 5G network may be subject to lawful intercept. Given the transition from existing network architectures to future network architectures, the inter-networked lawful intercept service may expand the use of network resources without forfeiting their use in existing frameworks.

FIG. 1 is a diagram illustrating an exemplary environment 100 in which an exemplary embodiment of the inter-networked lawful intercept service may be implemented. As illustrated, environment 100 includes an access network 105 a core network 150, an external network 170, and a lawful intercept (LI) network 180. Access network 105 includes access devices 110, core network 150 includes core devices 155, external network 170 includes external devices 175, and lawful intercept network 180 includes lawful intercept devices 185. Environment 100 further includes end devices 199.

The number, type, and arrangement of networks illustrated in environment 100 are exemplary. Additionally, or alternatively, other networks not illustrated in FIG. 1 may be included in environment 100, such as a backhaul/fronthaul network or another type of intermediary network, as described herein.

The number, the type, and the arrangement of network devices in access network 105, core network 150, external network 170, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the inter-networked lawful intercept service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) or a new interface of the network device may be provided in order to support the communication (e.g., transmission and reception of messages, Information Elements (IE), Attribute Value Pairs (AVPs), etc.) between network devices and the inter-networked lawful intercept service logic, as described herein. According to various exemplary implementations, the interface of the network device may be a service-based interface or a reference point-based interface.

Access network 105 may include one or multiple networks of one or multiple types and technologies. For example, access network 105 may include a 4G RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a Local Area Network (LAN), a Bluetooth network, a Personal Area Network (PAN), or another type of network (e.g., a legacy Third Generation (3G) RAN, etc.) that may be considered a network edge. Additionally, or alternatively, access network 105 may include a wired network, an optical network, or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG Core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), Centralized Unit (CU) and Distributed Unit (DU), interface splitting (e.g., F1-U, F1-C, E1, Xn-C, Xn-U, X2-C, Common Public Radio Interface (CPRI), etc.) as well as other types of network services, such as Dual Connectivity (DC) or higher (e.g., a secondary cell group (SCG) split bearer service, a master cell group (MCG) split bearer, an SCG bearer service, Non-StandAlone (NSA), StandAlone (SA), etc.), CA (e.g., intra-band, inter-band, contiguous, non-contiguous, etc.), network slicing, Coordinated MultiPoint (CoMP), various duplex schemes (e.g., Frequency Division Duplex (FDD), Time Division Duplex (TDD), Half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a Radio Network Controller (RNC), a Remote Radio Head (RRH), a BaseBand Unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Access devices 110 may include wired and/or optical devices (e.g., modem, wired access point, optical access point, Ethernet device, etc.) that provide network access.

Core network 150 may include one or multiple networks of one or multiple types and technologies. According to an exemplary embodiment, core network 150 includes a complementary network of access network 105. For example, core network 150 may be implemented to include an EPC of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a Mobility Management Entity (MME), a Packet GateWay (PGW), a Serving GateWay (SGW), a Home Agent (HA), a GPRS Support Node (GGSN), a Home Subscriber Server (HSS), an Authentication, Authorization, and Accounting (AAA) server, a Policy Charging and Rules Function (PCRF), a Charging System (CS), a UPF, an Access and Mobility management Function (AMF), a SMF, a Unified Data Management (UDM) device, an AUthentication Server Function (AUSF), a Network Slice Selection Function (NSSF), a Network Repository Function (NRF), a Policy Control Function (PCF), a NetWork Data Analytics Function (NWDAF), a Network Exposure Function (NEF), and/or an Application Function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein.

According to an exemplary embodiment, core devices 155 includes core device 155 that provides inter-networked lawful intercept service, as described herein. For example, core device 155 may include Policy Control Functions (e.g., a PCF) for a future core network (e.g., a 5G core network). Core device 155 may receive lawful intercept information from external device 175, as described herein. Core device 155 may receive the lawful intercept information directly from external device 175 or via an intermediary network device, as described herein. Core device 155 may provide the lawful intercept information to other core devices 155 such that lawful intercept surveillance may be performed in core network 150. For example, the other core devices 155 may include Intercept Access Point (IAP) logic that provides lawful intercept information, such as Intercept-Related Information (IRI) and Communication Content (CC).

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, an Intranet, a private network, a public network, or other type of network that hosts an end device application or service.

Depending on the implementation, external network 170 may include various network devices, such as external devices 175. For example, external devices 175 may provide various applications, services, or other type of end device assets, such as servers (e.g., web, application, cloud, etc.), mass storage devices, and/or data center devices. According to various exemplary implementations, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, real-time communications (e.g., voice, video conferencing, etc.), and/or messaging (e.g., texting, etc.).

External devices 175 may also include network devices that provide other network-related functions, such as network management, load balancing, security, authentication and authorization, policy control, billing, and routing.

According to an exemplary embodiment, external devices 175 include external device 175 that provides the inter-networked lawful intercept service, as described herein. For example, external device 175 may be a network device of an IMS network. External device 175 may provide lawful intercept information to core device 155 of a future core network (e.g., core network 150) based on various triggering events, as described herein. External device 175 may provide the lawful intercept information to core device 155 directly or via an intermediary network device, as described herein.

Lawful intercept network 180 includes a network that supports lawful interception. Lawful intercept network 180 may be accessed and used by a Law Enforcement Agent (LEA) and other authorized entities. Lawful intercept devices 185 may include various devices, such as an administration function (ADMF), a Mediation Function (MF), a Law Enforcement Agency (LEA) device, and a Law Enforcement Monitoring Facility (LEMF) device. Lawful intercept network 180 may include various LI interfaces (e.g., LI_ADMF, LI_X1, LI_X2, LI_X3, LI_HI1, LI_HI2, LI_HI3, etc.) that are used to communicate with, for example, core network 150 and external network 170, and may be used to communicate content of communication (CC) and IRI information.

End device 199 includes a device that has computational and communicative capabilities (e.g., wired, wireless, optical, etc.). Depending on the implementation, end device 199 may be a mobile device, a portable device, a stationary device, a device operated by a user (e.g., User Equipment (UE), and so forth. For example, end device 199 may be implemented as a smartphone, a mobile phone, a personal digital assistant, a tablet, a netbook, a phablet, a wearable device (e.g., a watch, glasses, etc.), a computer, a device in a vehicle, or other types of wireless, wired, and/or optical devices. End device 199 may be configured to execute various types of software (e.g., applications, programs, etc.). The number and the types of software may vary among end devices 199.

End device 199 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 199 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 199 may vary among end devices 199.

Figure 2:
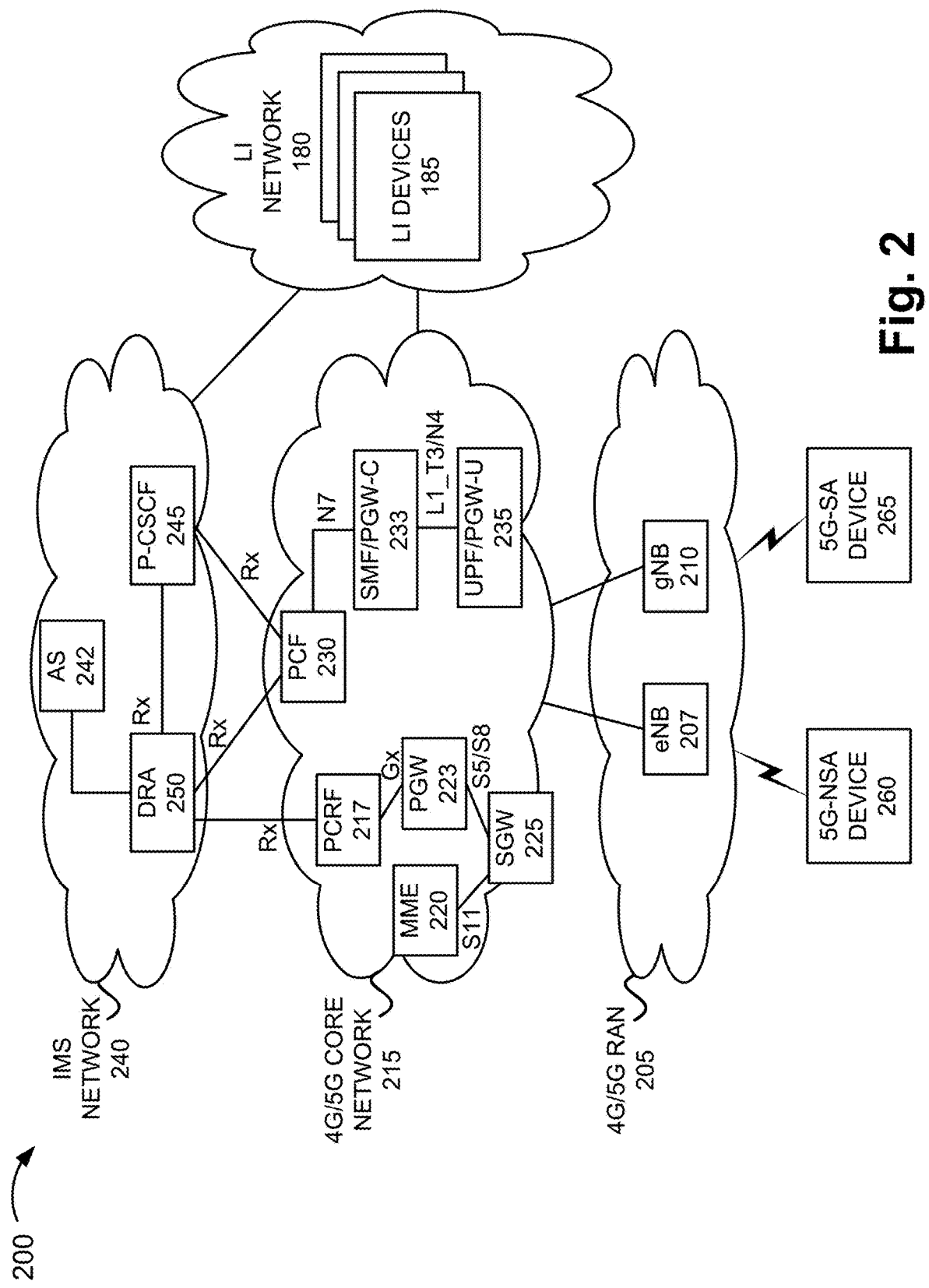
FIG. 2 is a diagram illustrating another exemplary environment in which an exemplary embodiment of a inter-networked lawful intercept service may be implemented.

FIG. 2 is a diagram illustrating an exemplary environment 200 in which an exemplary embodiment of the inter-networked lawful intercept service may be implemented. As illustrated, environment 200 may include a 4G/5G RAN 205, a 4G/5G core network 215, and an IMS network 240. 4G/5G RAN 205 may include an eNB 207 and a gNB 210. 4G/5G core network 215 may include 4G core devices, such as a PCRF 217, an MME 220, a PGW 223, and an SGW 225. Additionally, 4G/5G core network 215 may include 5G core devices, such as a PCF 230, an SMF/PGW-C 233, and a UPF/PGW-U 235. IMS network 240 may include an Application Server (AS) 242, a Diameter Routing Agent (DRA) 250, and a Proxy-CSCF 245. Environment 200 may further include a 5G-NSA device 260 and a 5G-SA device 265 (also referred to as end device 260/265). Additionally, as further illustrated, environment 200 includes exemplary communication links between network devices and exemplary interfaces (e.g., Rx, N7, L1_T3/NF, Gx, S11, and S5/S8).

Similar to environment 100, the number, type, and arrangement of networks in environment 200 are exemplary. Additionally, the number, type, and arrangement of network devices in 4G/5G RAN 205, 4G/5G core network 215, and IMS network 240 are exemplary. Some network devices of a network have been omitted from illustration for the sake of brevity. The number and the arrangement of communication links in environment 200 are exemplary, as well as the interfaces. Environment 200 may also include various planes of communications, as described herein. According to some exemplary embodiments, a network device may include a modified or a new interface to support a communication pertaining to the inter-networked lawful intercept service, as described herein.

eNB 207, gNB 210, PCRF 217, MME 220, PGW 223, and SGW 225 may each operate and provide functions according to a standard (e.g., 3GPP, ITU, etc.), a non-standard, and/or a proprietary technology. PGW 223 and SGW 225 may each include logic that supports lawful interception and interfaces with LI devices 185.

PCF 230 may operate and provide functions according a standard (e.g., 3GPP, ITU, etc.), a non-standard, and/or a proprietary technology associated with policy control functionalities, such as providing policy rules for control plane functions including network slicing, roaming, and mobility management, accessing subscription information relevant for policy decisions in a data repository (e.g., a UDM, a unified data repository (UDR), etc.), and supporting 5G QoS policy and charging control functions.

According to an exemplary embodiment, PCF 230 may include logic that provides the inter-networked lawful intercept service, as described herein. According to one exemplary embodiment as described herein, PCF 230 may receive LI information from P-CSCF 245 via DRA 250 (or other suitable intermediary network device). According to another exemplary embodiment, as described herein, PCF 230 may receive LI information from P-CSCF 245 directly (e.g., without an intermediary network device). According to one exemplary implementation, PCF 230 and P-CSCF 245 may directly communicate via an Rx interface. According to another exemplary implementation, PCF 230 and P-CSCF 245 may directly communication via an interface other than an Rx interface (e.g., REST API, N5, etc.).

According to an exemplary embodiment, PCF 230 may include logic that when a Diameter message or a message that includes lawful intercept information from P-CSCF 245 or DRA 250 is received, PCF 230 may forward the Diameter message or other type of message to SMF/PGW-C 233, as described herein. For example, PCF 230 may forward the (Diameter) message to SMF/PGW-C 233 via an N7 interface.

SMF/PGW-C 233 may include a network device that may operate and provide functions according to a standard (e.g., 3GPP, ITU, etc.), a non-standard, and/or a proprietary technology associated with SMF and PGW-C devices. For example, SMF/PGW-C 233 may include SMF functionalities, such as session management, UE IP address allocation and management, selection and control of a UPF, traffic steering, and control part of policy enforcement and QoS at UPF/PGW-U 235. SMF/PGW-C 233 may also include PGW functionalities that control the functionality performed by a PGW-U, such as selection and controls of the point of attachment to that PDN for the life of the EPS bearer, resource management for bearer resources, bearer binding, subscriber IP address management, and mobility support. According to other exemplary embodiments, SMF/PGW-C 233 may not include the functionalities relating to a PGW-C. SMF/PGW-C 233 may include logic that supports lawful interception (e.g., IRI-Point Of Interception (IM-POI) logic, CC-triggering function logic (CC-TF, etc.), interfaces with LI devices 185, as well as an LI interface with UPF/PGW-U 235 (e.g., LI_T3).

According to an exemplary embodiment, SMF/PGW-C 233 may include logic that provides the inter-networked lawful intercept service, as described herein. For example, SMF/PGW-C 233 may interpret and/or decode the lawful intercept information received from PCF 230. In response, SMF/PGW-C 233 may generate IRI pertaining to Packet Data Unit (PDU) session establishment, modification, and release based on the lawful intercept information received from PCF 230. SMF/PGW-C 233 may also generate IRI when a PDU session has already been established for a target end device 260/265. Additionally, based on receiving the lawful intercept information from PCF 230, SMF/PGW-C 233 may generate and transmit a message to UPF/PGW-U 235 for CC interception. The message may include lawful intercept parameters.

UPF/PGW-U 235 may include a network device that may operate and provide functions according to a standard (e.g., 3GPP, ITU, etc.), a non-standard, and/or a proprietary technology associated with UPF and PGW-U devices. For example, UPF/PGW-U 235 may include UPF functionalities, such as packet routing and forwarding, packet inspection, policy rule enforcement on the user plane, traffic usage reporting, QoS handling on the user plane, and so forth. UPF/PGW-U 235 may also include PGW user plane functionalities. According to other exemplary embodiments, UPF/PGW-U 235 may not include the functionalities relating to a PGW-U. UPF/PGW-U 235 may include logic that supports lawful interception (e.g., CC-POI logic), interfaces with LI devices 185, as well as an LI interface with SMF/PGW-C 233 (e.g., LI_T3). UPF/PGW-U 235 may provide CC lawful interception based on the lawful intercept parameters received from SMF/PGW-C 233.

AS 242 may include a network device that provides an end device application or service. AS 242 may operate in a service layer of IMS network 240. For example, AS 242 may provide a voice service or another type of application or service (e.g., RCS) that may be subject to a lawful interception.

P-CSCF 245 may operate and provide functions according to a standard (e.g., 3GPP, ITU, etc.), a non-standard, and/or a proprietary technology. For example, P-CSCF 245 may operate in a control layer of IMS network 240. P-CSCF 245 may function as a SIP proxy that monitors signaling between end device 260/265 and IMS network 240. For example, P-CSCF 245 may validate and forward requests from end device 260/265, and process and forward responses to end device 260/265. P-CSCF 245 may be configured to provide other functions, such as a Policy Decision Function (PDF). P-CSCF 245 may include logic that supports lawful interception for communications supported by non-5G or future core devices, interfaces with LI devices 185, and an interface to a 4G core device (e.g., PCRF, etc.) via which lawful intercept information may be communicated.

According to an exemplary embodiment, P-CSCF 245 may include logic that provides the inter-networked lawful intercept service, as described herein. P-CSCF 245 may be provisioned, by LI network 180, with lawful intercept information. Generally, the lawful intercept information may identify the target of the lawful intercept and what action needs to be taken. According to various exemplary embodiments, the lawful intercept information may pertain to IRI or IRI and CC. The lawful intercept information may include intercept subject identifiers, IRI parameters and values, and CC parameters and values. As described herein, the lawful intercept information may pertain to various communications (e.g., voice, multimedia, packet data, etc.), SIP-based applications, and so forth. According to one exemplary embodiment, the lawful intercept information may include information (e.g., AVPs, etc.), as described in U.S. Pat. No. 8,588,109 B2, the disclosure of which is incorporated in its entirety herein. According to other exemplary embodiments, the lawful intercept information may be according to a standard (e.g., 3GPP, ETSI, ITU, etc.), a non-standard, and/or a proprietary framework.

According to an exemplary embodiment, P-CSCF 245 may invoke the inter-networked lawful intercept service based on the detection of a communication setup. According to other exemplary embodiments, P-CSCF 245 may invoke the inter-networked lawful intercept service based on another type of triggering event. For example, P-CSCF 245 may invoke the inter-networked lawful intercept service in response to a provisioning of lawful intercept information from LI network 180. P-CSCF 245 may provide lawful intercept information to PCF 230 regarding a target end device, which may be attached to IMS network 240, but a communication session has not been initiated, in response to a communication session that is being set-up (e.g., triggered by a SIP INVITE message and the session owner matches a target in an LI target database stored by the P-CSCF 245), an already existing communication session. According to other examples, P-CSCF 245 may provide lawful intercept information to PCF 230 when an IMS session (e.g., an IMS bearer) is being established for all users. According to such an example, a third party monitoring message flows will not be able to detect which user session is under surveillance, and this mechanism may satisfy the LI "undetectability" by third party requirement.

According to some exemplary embodiments, the inter-networked lawful intercept service may pertain to only a communication session that is supported (e.g., in whole or in part (e.g., dual connectivity, etc.) by 5G core devices (e.g., UPF 235, SMF 233, etc.).

According to an exemplary embodiment, P-CSCF 245 may determine whether to provide lawful intercept information to PCF 230 (directly or indirectly via DRA 250) or a 4G core device based on context information, the lawful intercept information (e.g., intercept subject identifiers, etc.), and a communication setup message (e.g., a SIP message, etc.). For example, the context information may indicate the type of target subscriber (e.g., 5G end device versus 4G end device), bearer setup information that may indicate use of 5G core network devices or not, and/or other types of information (e.g., target end device is attached and/or connected to a 5G core network, etc.). According to other exemplary embodiments, P-CSCF 245 may not make such a determination. For example, P-CSCF 245 may provide lawful intercept information only to PCF 230 (and not 4G core devices).

As described, depending on the embodiment, P-CSCF 245 may transmit lawful intercept information to PCF 230, directly or indirectly via an intermediary network device (e.g., DRA 250). According to an exemplary embodiment, P-CSCF 245 may include the lawful intercept information in a Diameter message. For example, the Diameter message may be an Authentication Authorization Request (AAR) message or another type of Diameter request message.

DRA 250 may include a network device that may route Diameter messages based on any field included in a Diameter message. DRA 250 may be configured to route a Diameter message (e.g., an AAR message, etc.) received from P-CSCF 245 to PCF 230. DRA 250 may also be configured to route a message that includes lawful intercept information to PCF 230.

IMS network 240 may include other types of network devices, such as an Interrogating-CSCF (I-CSCF), a Serving-CSCF (S-CSCF), a Media Resource Function (MRF), a Domain Name System (DNS), a Session Border Controller (SBC), a Media GateWay (MGW), and other types of network devices which have been omitted from the Figures and description for the sake of brevity.

Figure 3B:
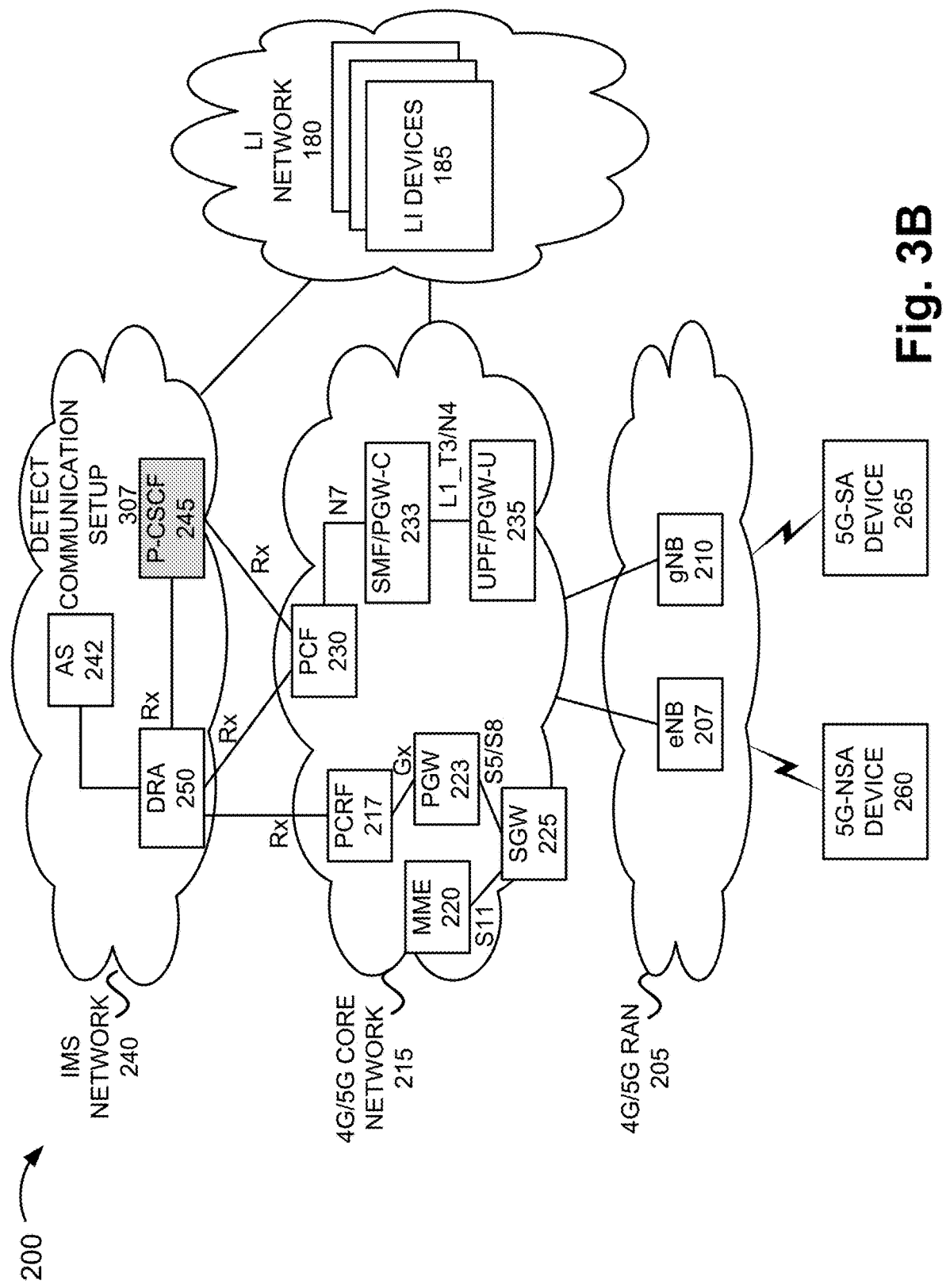

FIGS. 3A-3I are diagrams illustrating an exemplary process of the inter-networked lawful intercept service. Referring to FIG. 3A, P-CSCF 245 may store lawful intercept information. For example, P-CSCF 245 may have received lawful intercept information from LI device 185. According to an exemplary scenario, assume that the lawful intercept information indicates that end device 260 is subject to lawful intercept.

Referring to FIG. 3B, assume that end device 260 registers with IMS network 240. Thereafter, end device 260 initiates a SIP-based communication. As a consequence, P-CSCF 245 may receive a SIP INVITE message, and may detect a communication setup 307. P-CSCF 245 may compare a SIP header (e.g., a "P-Asserted-Identity" header, a "From" header, etc.) to the provisioned lawful intercept information. According to this exemplary scenario, assume that P-CSCF 245 may determine that there is a match. According to some exemplary embodiments, P-CSCF 245 may also access context information, and determine whether to transmit lawful intercept information to PCF 230 or not.

Figure 3C:
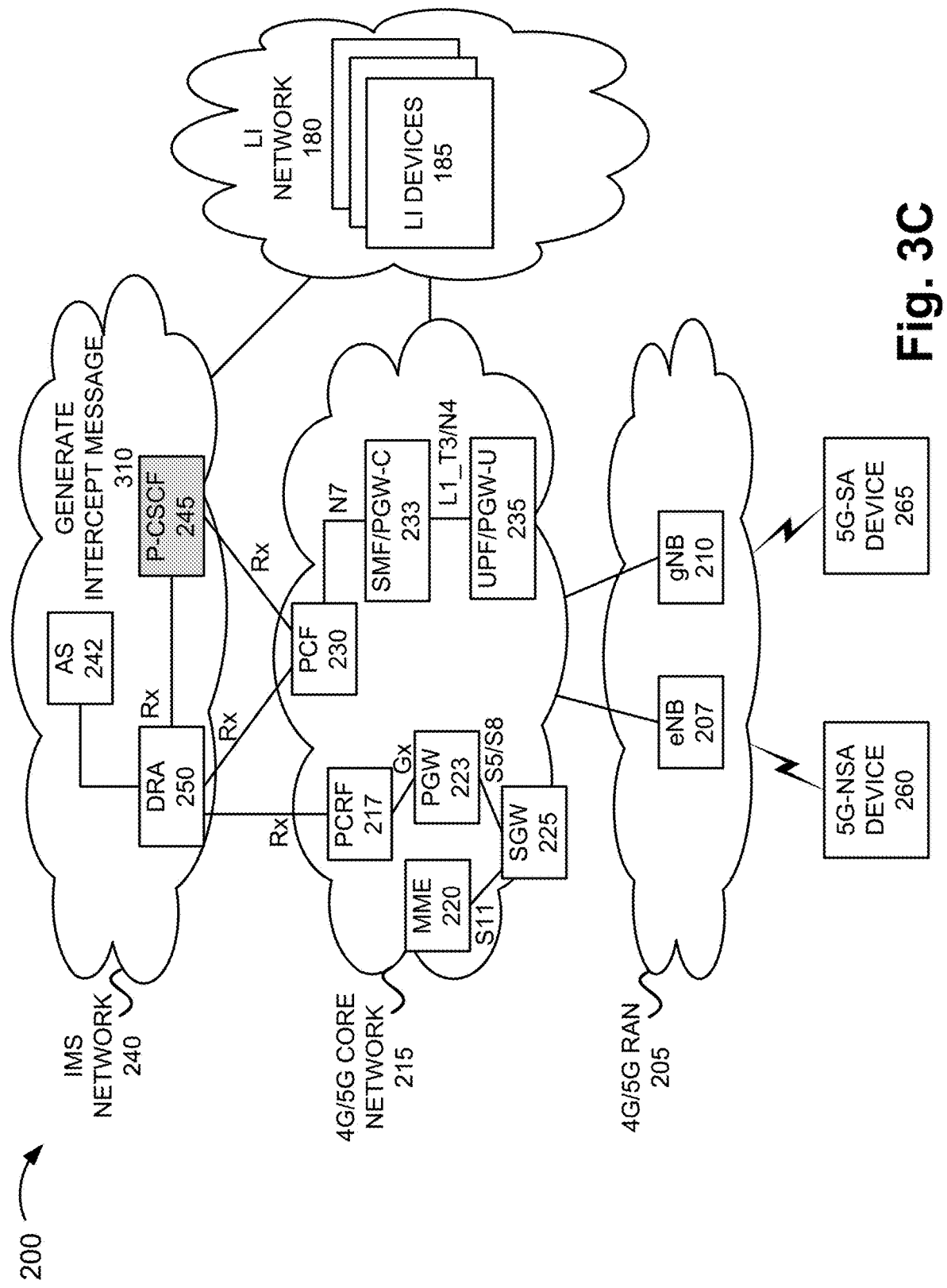

Referring to FIG. 3C, P-CSCF 245 may generate an intercept message 310. For example, based on the type of lawful interception, P-CSCF 245 may generate AVPs and/or other types of parameters and values that indicate the subject of the lawful interception (e.g., subject identifier), the action to be taken (IRI interception, CC interception, etc.), and other information (e.g., an address/port for sending intercepted content, etc.). P-CSCF 245 may encrypt the message or a portion thereof. According to an exemplary implementation, P-CSCF 245 may include the lawful intercept information in a Diameter AAR message or other type of Diameter request message.

Figure 3D:
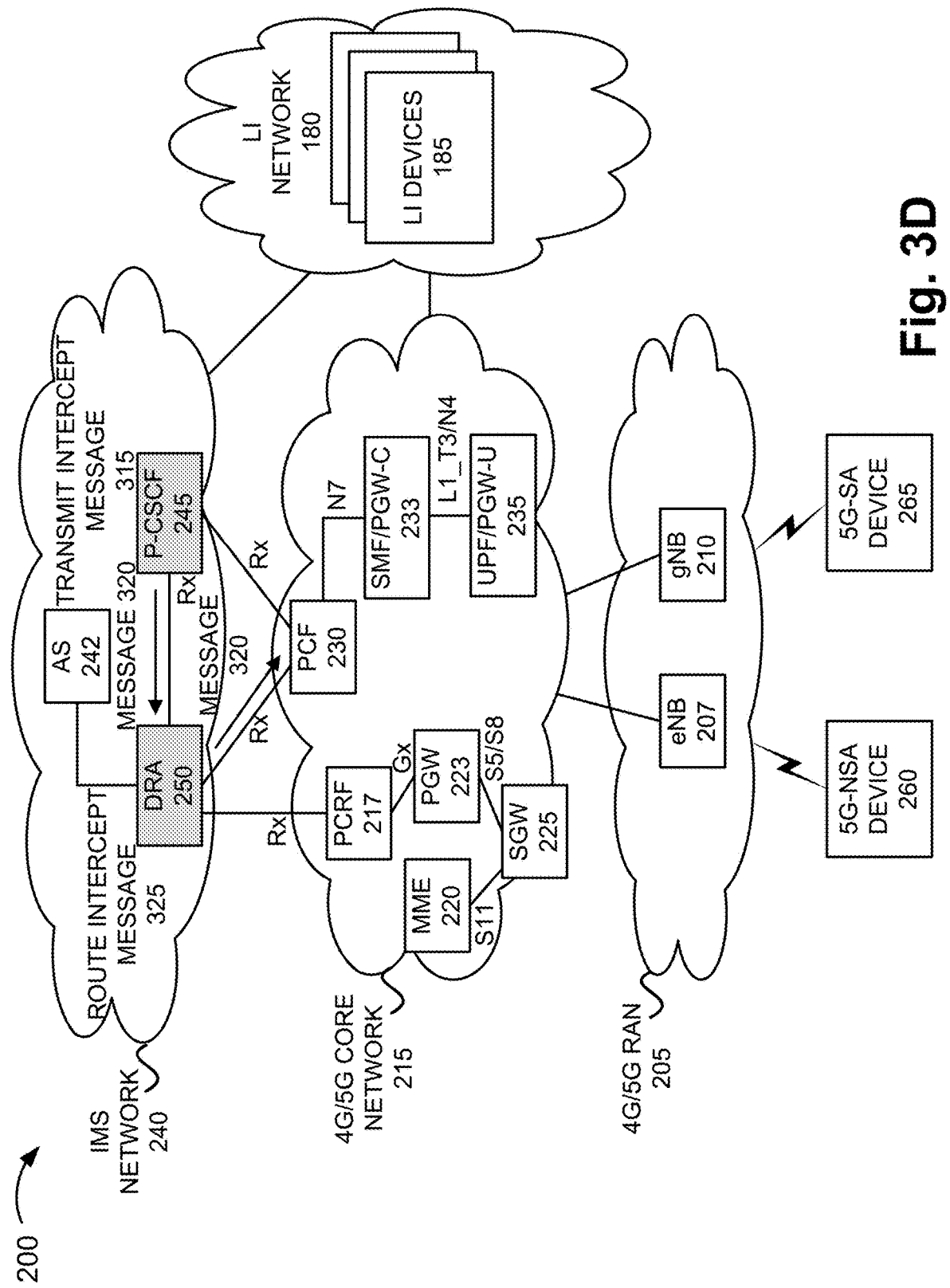
Figure 3E:
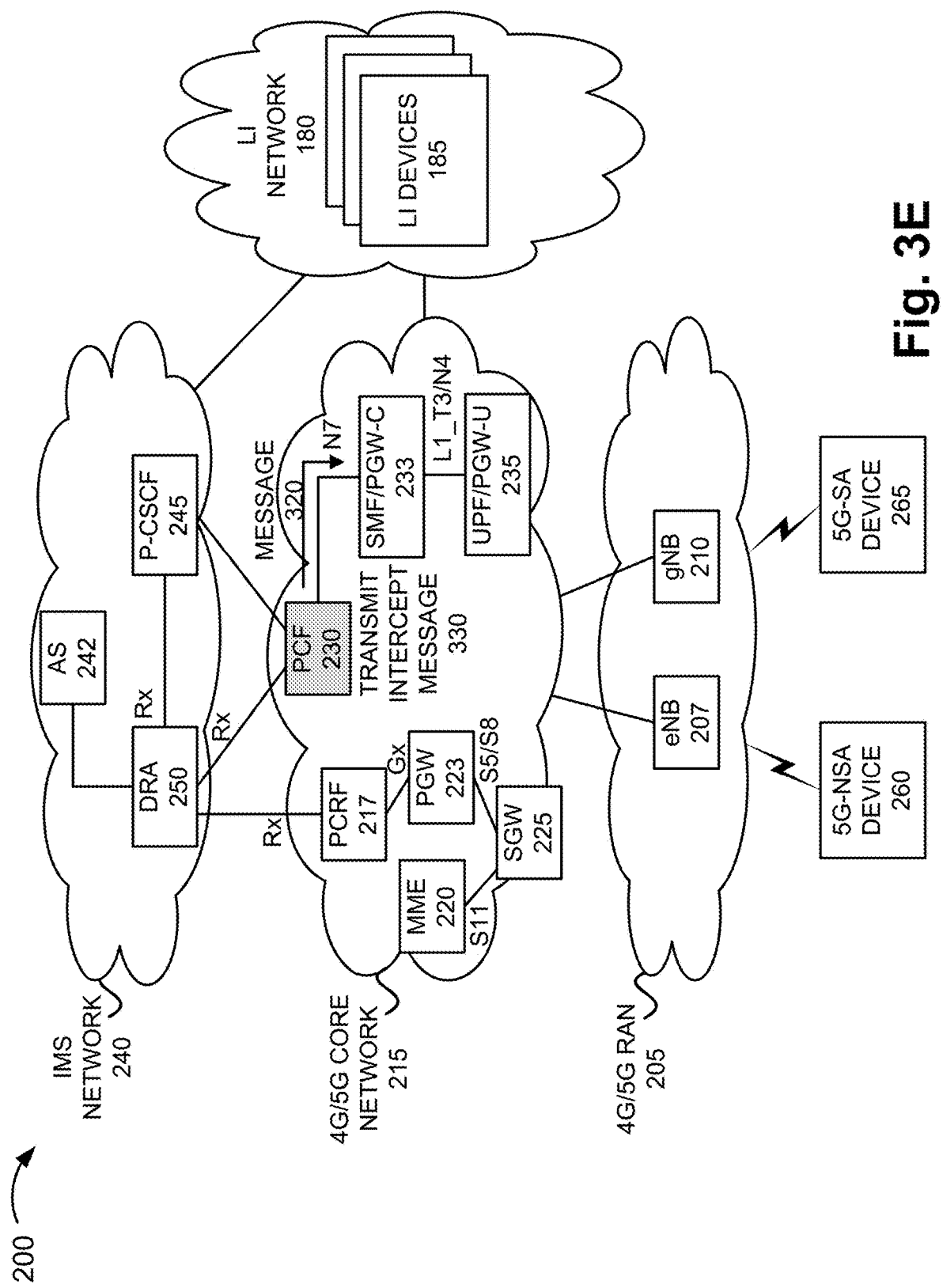

Referring to FIG. 3D, P-CSCF 245 may transmit the message 315. According to this exemplary scenario, P-CSCF 245 may transmit a message 320 to DRA 250 via the Rx interface. DRA 250 may route the intercept message 325 to PCF 230 via the Rx interface. Referring to FIG. 3E, PCF 230 may receive message 320, and transmit the intercept message 330 to SMF/PGW-C 233 via an N7 interface. For example, PCF 230 may be configured to forward any AAR messages to SMF/PGW-C 233. Alternatively, PCF 230 may inspect the incoming message, determine that the message includes lawful intercept information, and forward the message to SMF/PGW-C 233.

Figure 3F:
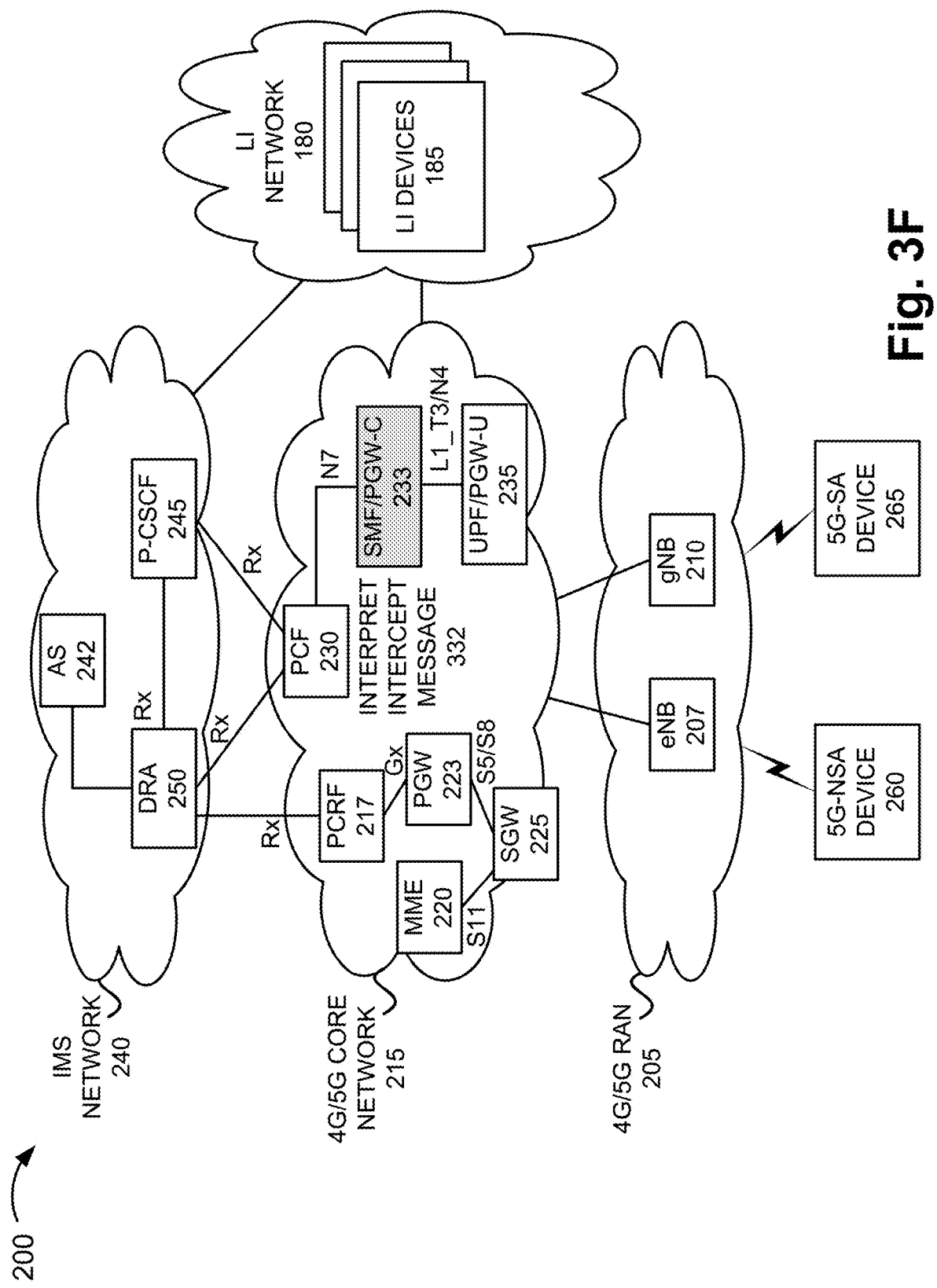
Figure 3G:
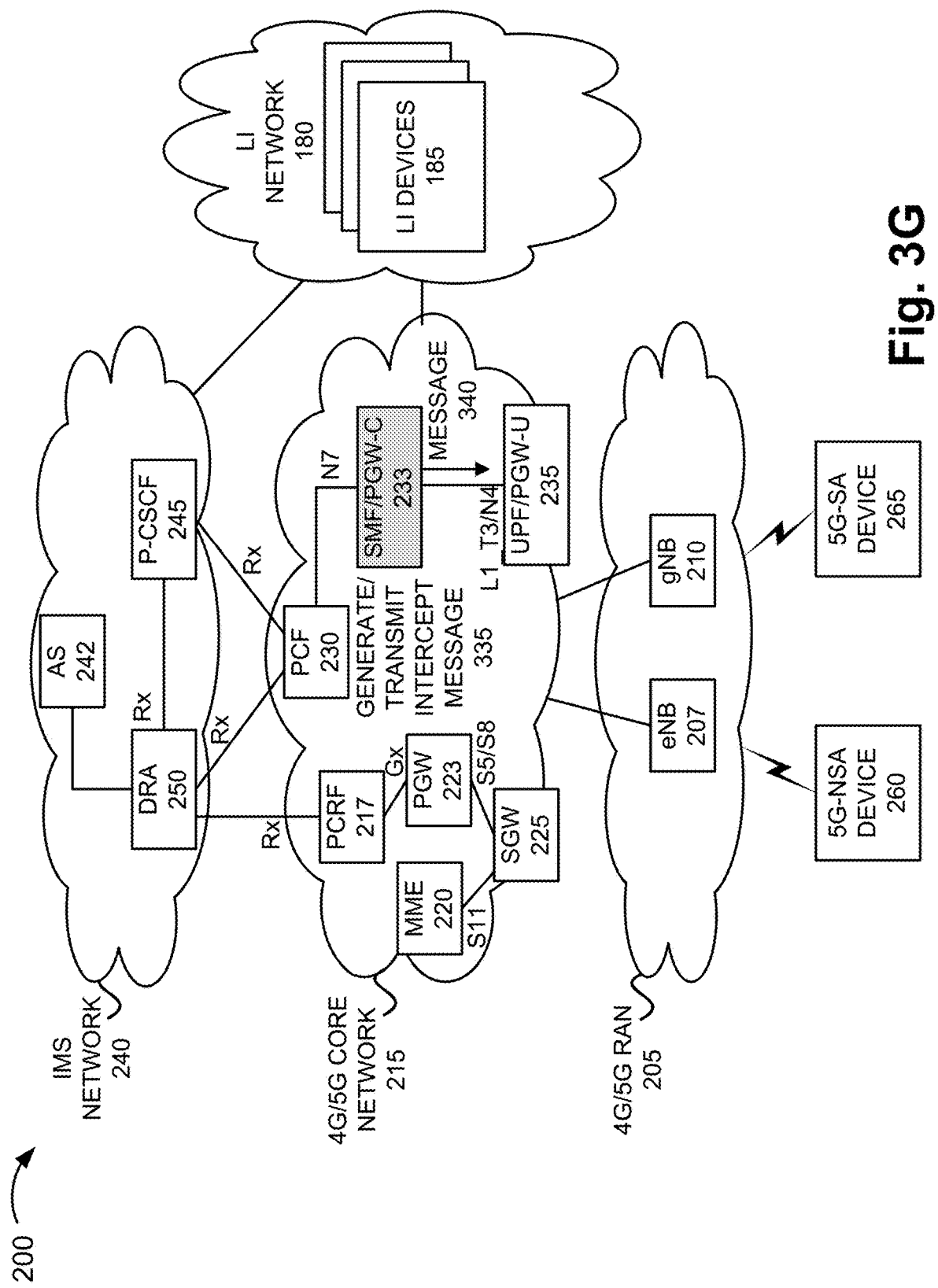
Figure 3H:
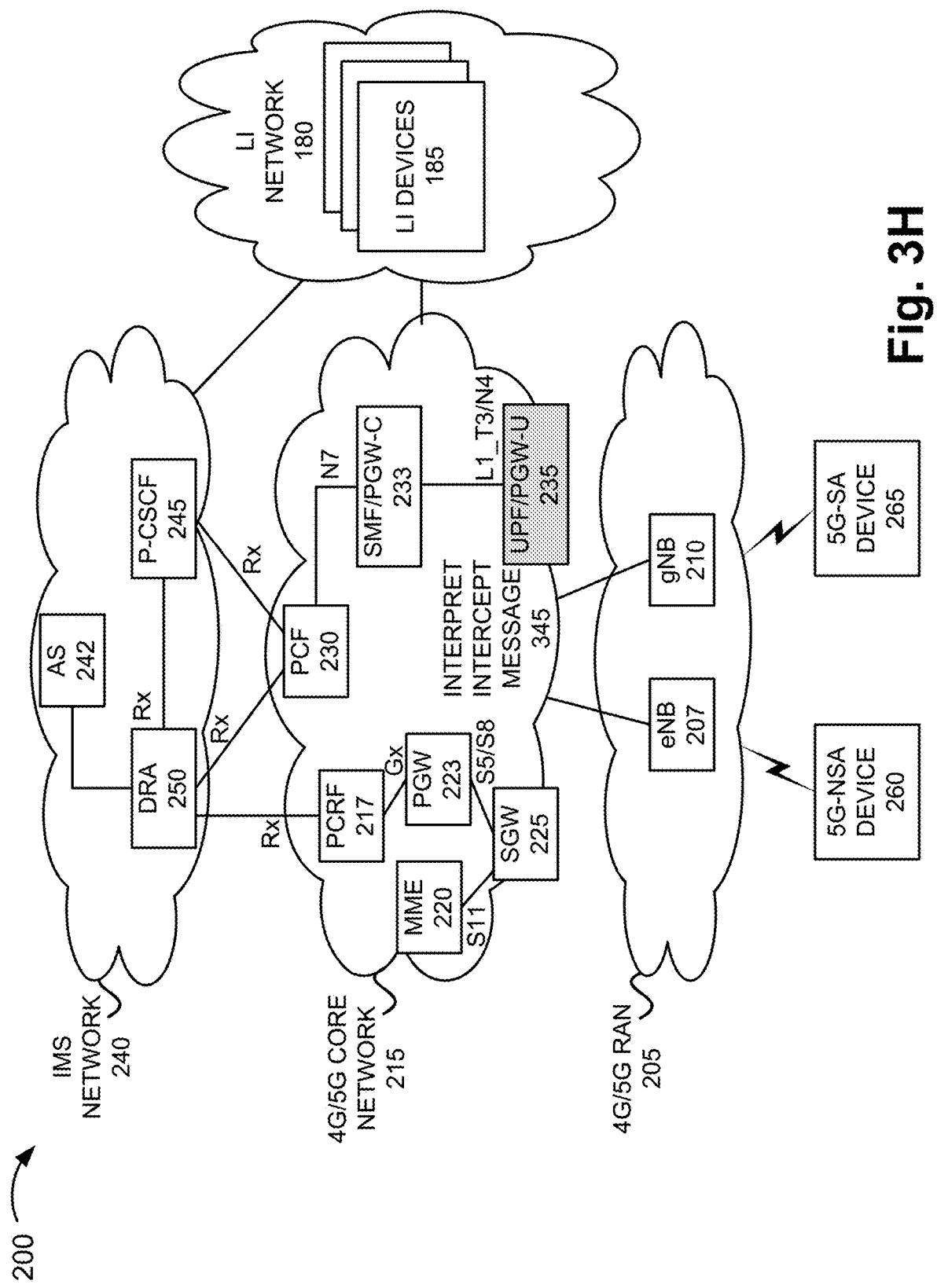
Figure 3I:
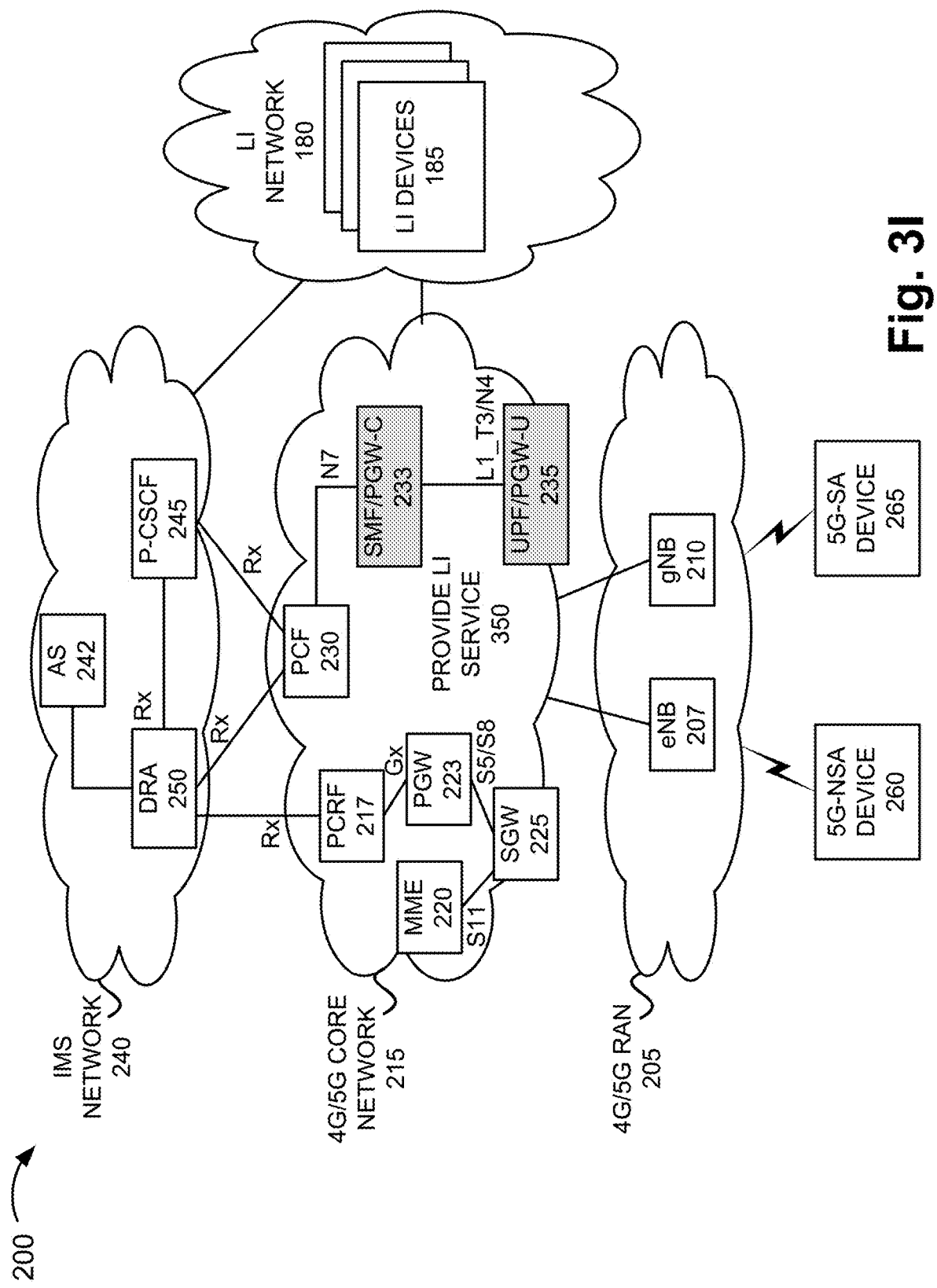

Referring to FIG. 3F, SMF/PGW-C 233 may interpret the intercept message 332. Based on the interpretation, SMF/PGW-C 233 may begin generating IRI pertaining to the PDU/IMS session. Referring to FIG. 3G, SMF/PGW-C 233 may generate and transmit an intercept message 335 to UPF/PGW-U 235. For example, a message 340 may include lawful intercept information pertaining to CC interception. Referring to FIG. 3H, UPF/PGW-U 235 may receive and interpret the intercept message 345. Based on the interpretation, UPF/PGW-U 235 may begin generating CC information. Referring to FIG. 3I, SMF/PGW-C 233 and UPF/PGW-U 235 may provide an LI service 350 associated with the IMS communication in which end device 265 is target.

FIGS. 3A-3I illustrate an exemplary process of the inter-networked lawful intercept service, according to other exemplary embodiments, the process may include additional, different, and/or fewer steps. For example, a triggering event for invoking the inter-networked lawful intercept service, at P-CSCF 245, may be based on an event other than a communication session setup (e.g., a voice call, etc.). For example, as described herein, P-CSCF 245 may invoke the inter-networked lawful intercept service based on various other events, such as the provisioning of lawful intercept information by LI network 180, a login or a registration process of end device 260/265 to IMS network 240, detection that an existing communication session of end device 260/265 is subject to lawful surveillance, and/or some other circumstance that requires lawful interception information to be provided to PCF 230 regarding a target end device 260/265.

FIG. 4 is a diagram illustrating exemplary components of a device 400 that may be included in one or more of the devices described herein. For example, device 400 may correspond to access devices 110, core devices 155, external devices 175, LI devices 185, end devices 199, PCF 230, SMF/PGW-C 233, UPF/PGW-U 235, P-CSCF 245, DRA 250, and other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a Random Access Memory (RAM), a Dynamic Random Access Memory (DRAM), a Static Random Access Memory (SRAM), a cache, a Read Only Memory (ROM), a Programmable Read Only Memory (PROM), an Erasable PROM (EPROM), an Electrically EPROM (EEPROM), a Single In-line Memory Module (SIMM), a Dual In-line Memory Module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a Compact Disk (CD), a Digital Versatile Disk (DVD), a Blu-Ray Disk (BD), a Solid State Disk (SSD), etc.). Memory/storage 415 may store data, software, and/or instructions related to the operation of device 400.

Software 420 includes an application or a program that provides a function and/or a process. As an example, with reference to P-CSCF 245, software 420 may include an application that, when executed by processor 410, provides a function of the inter-networked lawful intercept service, as described herein. Additionally, for example, with reference to PCF 230, SMF/PGW-C 233, UPF/PGW-U 235, and DRA 250, software 420 may include an application that, when executed by processor 410, provides a function of the inter-networked lawful intercept service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
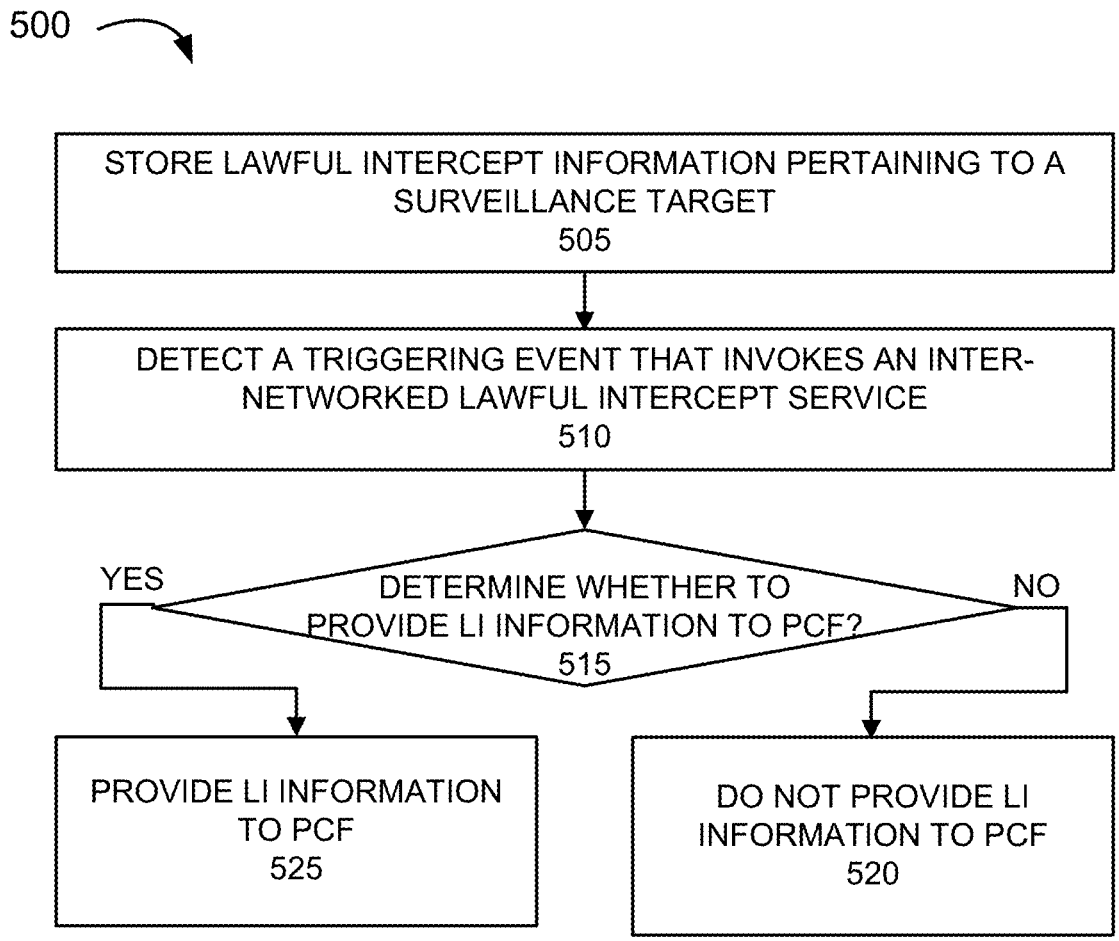
FIG. 5 is a flow diagram illustrating an exemplary process of an exemplary embodiment of the inter-networked lawful intercept service.

FIG. 5 is a flow diagram illustrating an exemplary process 500 of an exemplary embodiment of the inter-networked lawful intercept service. According to an exemplary embodiment, a P-CSCF may perform steps of process 500. For example, according to an exemplary embodiment, P-CSCF 245 of an IMS network 240 may perform the steps of process 500. According to an exemplary implementation, processor 410 executes software 420 to perform a step illustrated in FIG. 5, and described herein. Alternatively, a step illustrated in FIG. 5 and described herein, may be performed by execution of only hardware.

Referring to FIG. 5, in block 505, P-CSCF 245 may store lawful intercept information pertaining to a surveillance target. For example, the lawful intercept information may include one or more subject identifiers that are subject to lawful surveillance and action parameters and values (e.g., IRI parameters and values, CC parameters and values, etc.).

In block 510, P-CSCF 245 may detect a triggering event that invokes an inter-networked lawful intercept service. For example, P-CSCF 245 may receive a message that initiates a communication session. According to other examples, P-CSCF 245 may detect another type of event that invokes the inter-networked lawful intercept service, as described herein.

In block 515, it may be determined whether to provide the lawful intercept information to a PCF. For example, based on the detection of the triggering event, P-CSCF 245 may determine whether to provide the lawful intercept information to PCF 230. As previously described, P-CSCF 245 may use context information, the lawful intercept information, and communication message information (e.g., a SIP header, etc.) to determine whether lawful intercept information is to be provided regarding a target end device. P-CSCF 245 may make other determinations, such as whether the target end device is connected or attached to the network (e.g., in whole or in part) via 5G core network devices.

When it is determined that P-CSCF 245 should provide the lawful intercept information to PCF 230 (block 515-NO), then P-CSCF 245 does not provide the lawful intercept information to PCF 230 (block 520). According to some exemplary embodiments, process 500 may end. According to other exemplary embodiments, P-CSCF 245 may provide the lawful intercept information to another network device (e.g., PCRF 217).

When it is determined that P-CSCF 245 should provide the lawful intercept information to PCF 230 (block 515—YES), P-CSCF 245 may transmit the lawful intercept information to PCF 230. According to various exemplary embodiments, P-CSCF 245 may transmit the lawful intercept information directly to PCF 230 or via an intermediary network device (e.g., DRA 250). According to an exemplary embodiment, P-CSCF 245 may transmit the lawful intercept information via an Rx interface. According to an exemplary embodiment, P-CSCF 245 may generate and transmit a Diameter AAR message, which includes the lawful intercept information, to PCF 230. According to other exemplary embodiments, as previously described, other interfaces and/or messages may be used.

FIG. 5 illustrates an exemplary process 500 of the inter-networked lawful intercept service, however, according to other embodiments, process 500 may include additional operations, fewer operations, and/or different operations than those illustrated in FIG. 5, and described herein. For example, P-CSCF 245 may determine that no lawful intercept information is to be provided to any other network device.

Figure 6:
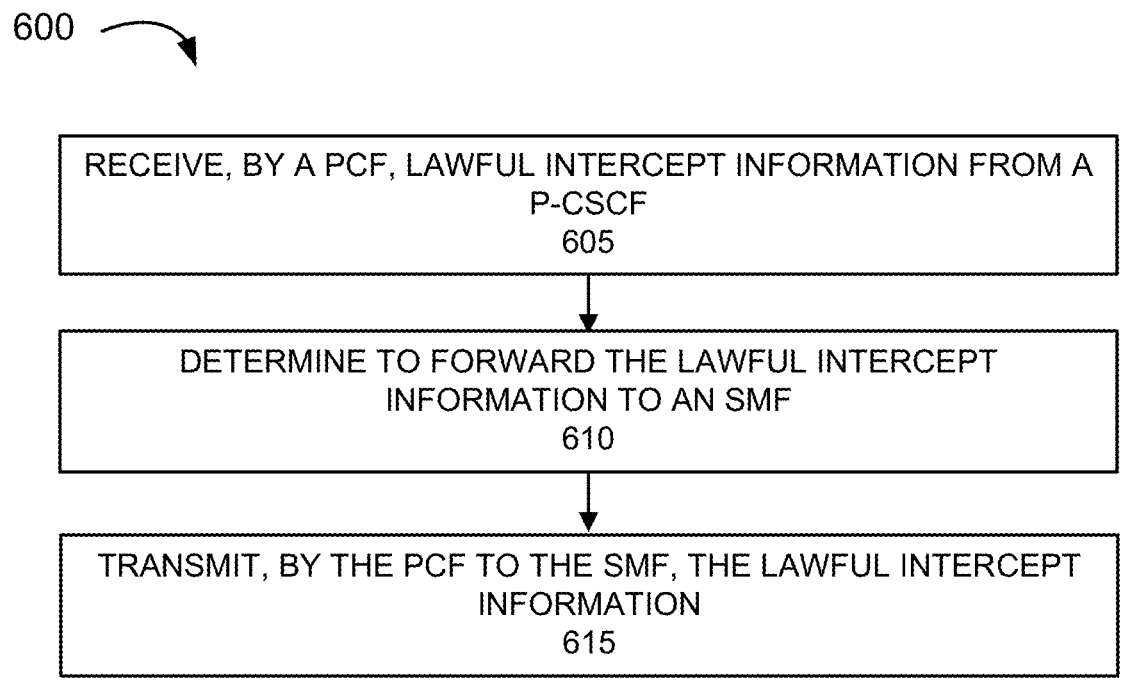
FIG. 6 is a flow diagram illustrating another exemplary process of an exemplary embodiment of the inter-networked lawful intercept service.

FIG. 6 is a flow diagram illustrating another exemplary process 600 of an exemplary embodiment of the inter-networked lawful intercept service. According to an exemplary embodiment, a PCF may perform steps of process 600. For example, according to an exemplary embodiment, PCF 230 of a future generation network (e.g., 5G core network 215 or other type of future generation core network) may perform the steps of process 600. According to an exemplary implementation, processor 410 executes software 420 to perform a step illustrated in FIG. 6, and described herein. Alternatively, a step illustrated in FIG. 6 and described herein, may be performed by execution of only hardware.

In block 605, a PCF may receive lawful intercept information from a P-CSCF. For example, PCF 230 may receive the lawful intercept information directly from P-CSCF 245 via an Rx interface (or other interface, as described herein) or via DRA 250 via an Rx interface. According to an exemplary embodiment, the lawful intercept information may be received in a Diameter AAR message or another type of request message.

In block 610, the PCF may determine to forward the lawful intercept information to an SMF. For example, PCF 230 may determine to forward or transmit the lawful intercept information to SMF 233 based on the interface (e.g., Rx interface or other interface, as described herein) via which the message was received, detection that the message includes lawful intercept information, and/or the network device that sent the message (e.g., DRA 250 or P-CSCF 245).

In block 615, the PCF may transmit the lawful intercept information to the SMF. For example, PCF 230 may transmit the lawful intercept information to SMF 233 via an N7 interface or other type of interface that communicatively couples PCF 230 to SMF 233. According to an exemplary embodiment, PCF 230 may transmit a Diameter AAR message, which includes the lawful intercept information, to SMF 233. According to other exemplary embodiments, another type of Diameter request message may be used.

FIG. 6 illustrates an exemplary process 600 of the inter-networked lawful intercept service, however, according to other embodiments, process 600 may include additional operations, fewer operations, and/or different operations than those illustrated in FIG. 6, and described herein.

Figure 7:
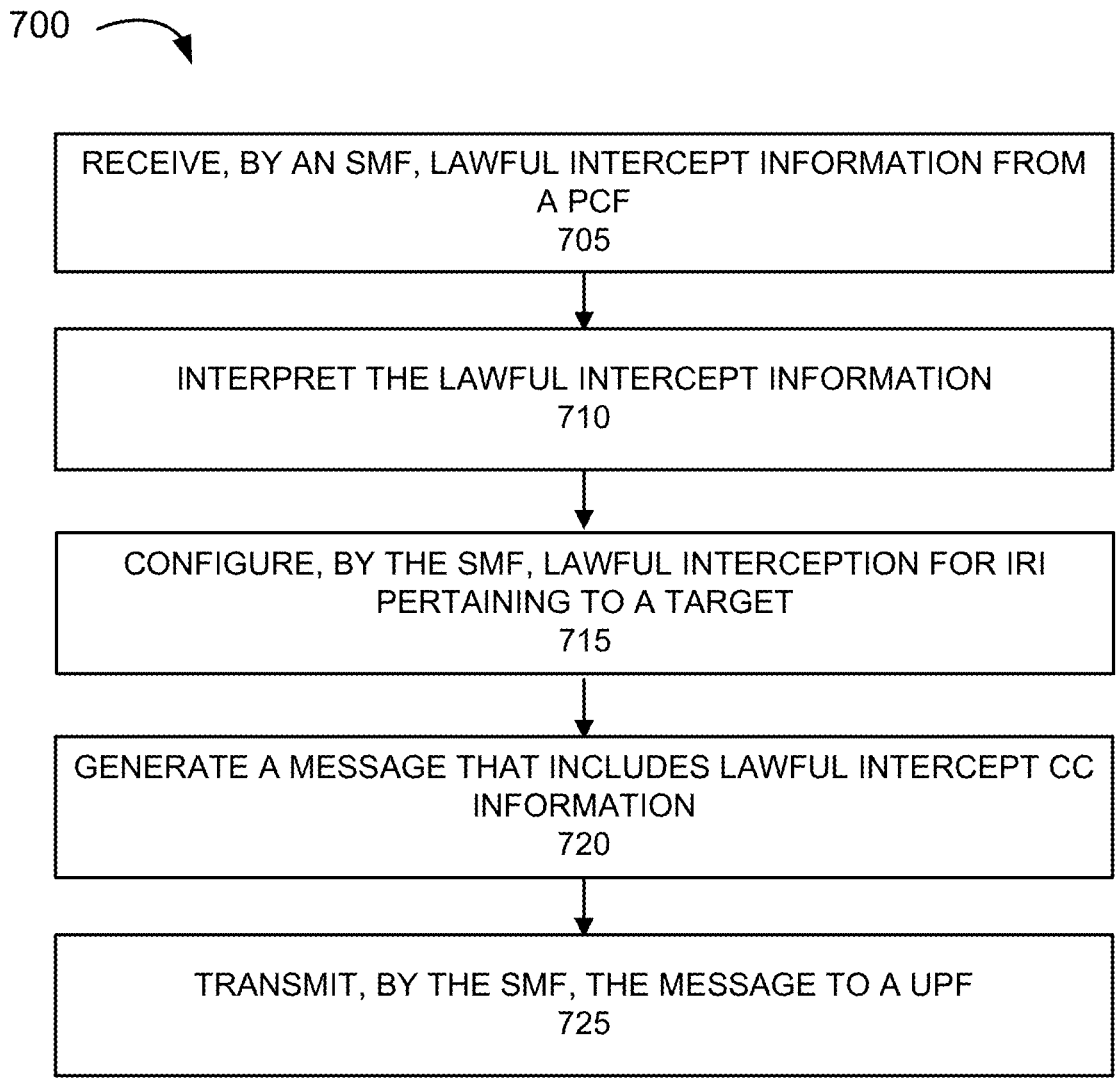
FIG. 7 is a flow diagram illustrating yet another exemplary process of an exemplary embodiment of the inter-networked lawful intercept service.

FIG. 7 is a flow diagram illustrating yet another exemplary process 700 of an exemplary embodiment of the inter-networked lawful intercept service. According to an exemplary embodiment, an SMF may perform steps of process 700. For example, according to an exemplary embodiment, SMF 233 of a future generation network (e.g., 5G core network 215 or other type of future generation core network) may perform the steps of process 700. According to an exemplary implementation, processor 410 executes software 420 to perform a step illustrated in FIG. 7, and described herein. Alternatively, a step illustrated in FIG. 7 and described herein, may be performed by execution of only hardware.

In block 705, an SMF may receive lawful intercept information from a PCF. For example, SMF 233 may receive a Diameter AAR or other type of Diameter request, which includes lawful intercept information, from PCF 230. According to an exemplary embodiment, SMF 233 may receive the lawful intercept information via an N7 interface.

In block 710, the SMF may interpret the lawful intercept information. For example, SMF 233 may interpret the lawful intercept information, such as IRI information.

In block 715, the SMF may configure lawful interception for IRI pertaining to target. For example, SMF 233 may be configured to intercept IRI pertaining to a target end device (e.g., end device 260/265.

In block 720, the SMF may generate a message that includes lawful intercept CC information. For example, SMF 233 may generate a lawful intercept message, which may be used by UPF 235 to conduct lawful intercept of CC information, based on the lawful intercept information received from PCF 230.

In block 725, the SMF may transmit the message to the UPF. For example, SMF 233 may transmit the message to UPF 235 via an L1-T3 interface or an N4 interface. SMF 233 may provide lawful interception pertaining to a target end device based on the lawful interception information received from PCF 230.

FIG. 7 illustrates an exemplary process 700 of the inter-networked lawful intercept service, however, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   storing, by a network device, lawful intercept information pertaining to an end device that was received from a law enforcement agency, wherein the network device includes a proxy-call session control function (P-CSCF) and is of a non-future generation application service layer network;
   detecting, by the network device, a triggering event;
   determining, by the network device in response to the detecting, whether to transmit the lawful intercept information to a policy control function (PCF) of a future generation core network based on context information pertaining to the end device; and
   transmitting, by the network device, the lawful intercept information to the policy control function in response to determining to transmit the lawful intercept information to the policy control function.

2. The method of claim 1, wherein the proxy-call session control function is included in an Internet Protocol Multimedia Subsystem (IMS) network.

3. The method of claim 1, wherein the transmitting comprises:
   transmitting, by the network device, the lawful intercept information to the policy control function via an Rx interface.

4. The method of claim 3, wherein the transmitting further comprises:
   transmitting, by the network device, the lawful intercept information to the policy control function via a Diameter Routing Agent device.

5. The method of claim 1, further comprising:
   generating, by the network device, a Diameter Authentication Authorization Request (AAR) message that includes the lawful intercept information, and wherein the transmitting further comprises:
   transmitting, by the network device, the AAR message to the policy control function.

6. The method of claim 1, further comprising:
   determining, by the network device, that the end device is connected to the future generation core network based on the context information.

7. The method of claim 1, wherein the detecting comprises:
   receiving, by the network device, a Session Initiation Protocol Invite message that pertains to the end device.

8. The method of claim 1, further comprising:
   storing, by the network device, the context information pertaining to the end device; and
   comparing, by the network device, the context information to the lawful intercept information.

9. A network device comprising:
   a communication interface;
   a memory, wherein the memory stores instructions; and
   a processor, wherein the processor executes the instructions to:
   store lawful intercept information pertaining to an end device that was received from a law enforcement agency, wherein the network device includes a proxy-call session control function (P-CSCF) and is of a non-future generation application service layer network;
   detect a triggering event;
   determine, in response to the detection, whether to transmit the lawful intercept information to a policy control function (PCF) of a future generation core network based on context information pertaining to the end device; and
   transmit, via the communication interface, the lawful intercept information to the policy control function in response to determining to transmit the lawful intercept information to the policy control function.

10. The network device of claim 9, wherein the proxy-call session control function is included in an Internet Protocol Multimedia Subsystem (IMS) network.

11. The network device of claim 9, wherein, when transmitting, the processor further executes the instructions to:
    transmit, via the communication interface, the lawful intercept information to the policy control function via an Rx interface.

12. The network device of claim 11, wherein, when transmitting, the processor further executes the instructions to:
    transmit, via the communication interface, the lawful intercept information to the policy control function via a Diameter Routing Agent device.

13. The network device of claim 9, wherein the processor further executes the instructions to:
    generate a Diameter Authentication Authorization Request (AAR) message that includes the lawful intercept information, and wherein, when transmitting, the processor further executes the instructions to:
    transmit, via the communication interface, the AAR message to the policy control function.

14. The network device of claim 9, wherein the processor further executes the instructions to:
    determine that the end device is connected to the future generation core network based on the context information.

15. The network device of claim 9, wherein the triggering event comprises:
    receive, via the communication interface, a Session Initiation Protocol Invite message that pertains to the end device.

16. The network device of claim 9, the processor further executes the instructions to:
    store the context information pertaining to the end device; and
    compare the context information to the lawful intercept information.

17. A non-transitory computer-readable storage medium storing instructions executable by a processor of a device, which when executed cause the device to:
- store lawful intercept information pertaining to an end device that was received from a law enforcement agency, wherein the device includes a proxy-call session control function (P-CSCF) and is of a non-future generation application service layer network;
- detect a triggering event;
- determine, in response to the detection, whether to transmit the lawful intercept information to a policy control function (PCF) of a future generation core network based on context information pertaining to the end device; and
- transmit the lawful intercept information to the policy control function in response to determining to transmit the lawful intercept information to the policy control function.

18. The non-transitory computer-readable storage medium of claim 17, wherein the proxy-call session control function is included in an Internet Protocol Multimedia Subsystem (IMS) network.

19. The non-transitory computer-readable storage medium of claim 18, wherein the instructions to transmit further comprise instructions, which when executed cause the device to:
- transmit the lawful intercept information to the policy control function via an Rx interface.

20. The non-transitory computer-readable storage medium of claim 17, wherein the instructions to further comprise instructions, which when executed cause the device to:
- determine that the end device is connected to the future generation core network based on the context information.

* * * * *